United States Patent [19]
Martin

[11] Patent Number: 4,831,818
[45] Date of Patent: May 23, 1989

[54] DUAL-FUEL, DUAL-MODE ROCKET ENGINE

[75] Inventor: James A. Martin, Gloucester, Va.

[73] Assignee: Administrator, National Aeronautics and Space Administration, Washington, D.C.

[21] Appl. No.: 165,946

[22] Filed: Mar. 9, 1988

[51] Int. Cl.[4] .......................... F02K 9/48; F02K 9/64
[52] U.S. Cl. ...................................... 60/204; 60/259; 60/260
[58] Field of Search .................. 60/259, 260, 258, 39, 60/463, 204

[56] References Cited

U.S. PATENT DOCUMENTS

| | | | |
|---|---|---|---|
| 3,910,037 | 10/1975 | Salkeld | 60/259 |
| 4,073,138 | 2/1978 | Beichel | 60/259 |
| 4,220,001 | 9/1980 | Beichel | 60/259 |
| 4,771,599 | 9/1988 | Brown et al. | 60/259 |
| 4,771,600 | 9/1988 | Limerick et al. | 60/259 |

OTHER PUBLICATIONS

Salkeld et al., "Reusable One—Stage To Orbit Shuttles", *Astronautic & Aeronautics*, Jun. 1973, pp. 48–57.

Beichel, "The Dual Expander Rocket Engine", *Astronautics & Aeronautics*, Nov. 1977, pp. 44–51.

Beichel, "Propulsion Systems for Single Stage Shuttles", *Astronautics & Aeronautics*, Nov. 1974, pp. 32–39.

*Primary Examiner*—Donald E. Stout
*Attorney, Agent, or Firm*—Harold W. Adams; John R. Manning; Charles E. B. Glenn

[57] ABSTRACT

A dual-fuel, dual-mode rocket engine 60 is made by modifying a baseline single-mode booster engine 10. A second hydrogen propellant system 62, and a fuel mixer 68 is added to provide a means for delivering and mixing a hydrogen fuel 66 with the baseline engine hydrocarbon fuel 36 upstream of exhaust nozzle cooling jacket 38. A second dual-fuel, dual-mode rocket engine 61 is made by modifying a baseline single-mode main engine 11. A hydrocarbon propellant system 63, and a fuel mixer 69 is added to provide a means for delivering and mixing a methane fuel 67 with the baseline engine hydrogen fuel 23 upstream of exhaust nozzle cooling jacket 27. The resulting fuel mixture within both embodiments of the invention described above is utilized for thrust chamber fuel and exhaust nozzle cooling. The relative quantities of each fuel within the mixture vary to provide a progressively less dense mixture throughout a rocket flight.

9 Claims, 3 Drawing Sheets

DUAL-FUEL, DUAL-MODE ROCKET ENGINE

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates to liquid rocket engines, and more particularly to dual-fuel, dual-mode rocket engines.

BACKGROUND OF THE INVENTION

To meet commercial, scientific, and military requirements in space, improved earth-to-orbit transportation must be developed. Any new vehicle should have low development costs, low operational costs, and increased performance over existing earth-to-orbit vehicles.

Of critical importance in the design of earth-to-orbit vehicles is the choice of fuel. Two parameters are useful in deciding which fuel to use. One parameter is the fuel specific-impulse, which is defined as the pounds of thrust that can be obtained per pound per second of propellant flow. The other parameter is the fuel density-impulse, which is defined as the product of the fuel specificimpulse and its density. It determines the necessary fuel tank volume, and therefore relates to the overall vehicle dry mass (which among other things relates to vehicle cost).

As explained in the *American Institute of Aeronautics and Astronautics (AIAA) Paper No.* 79-0878 (May 1979) entitled "Dual-Fuel Propulsion: Why it Works, Possible Engines, and Results of Vehicle Studies", by James A. Martin and Alan W. Wilhite, it is advantageous to use two fuels in any vehicle stage that operates from the earth surface to earth orbit. A high density-impulse fuel, such as a hydrocarbon, should be used in the first part of the vehicle trajectory. This is because a large fraction of the vehicle propellant mass is required to gain a small fraction of the vehicle final velocity. Therefore minimizing tank volume is important in this stage of the trajectory.

A high specific-impulse fuel, such as hydrogen, should be used in the second half of the vehicle trajectory. This is because the specific-impulse of the fuel has an increased effect on the vehicle performance at high velocities. Therefore a high specific-impulse fuel is advantageous later in the trajectory when vehicle velocities are high.

One way of using two fuels in a single stage is to equip the stage with a dual-fuel rocket engine. This type of engine uses two different types of fuel, such as hydrogen and a hydrocarbon, at different points in a rocket flight. Many variations of such an engine have been studied, many of which are described in the *American Institute of Aeronautics and Astronautics (AIAA) Paper No.* 87-1941 (June 1987) entitled "Space Transportation Main Engines for Single-Stage Vehicles", by James A. Martin. These include Dual-Expander engines, that have an inner thrust chamber and coannular outer thrust chamber that share a common exhaust nozzle, and Dual-Bell engines, that have two thrust chambers and two exhaust nozzles within a single engine. These tend to be very complex.

An engine concept called the "Dual Fuel/Single Bell", studied by Pratt & Whitney Aircraft of United Technologies Corporation, is particularly pertinent to the present invention. A combination of oxygen, hydrogen, and a hydrocarbon are all used to operate the engine. Hydrogen is used to cool the thrust chamber and drive the turbines, the hydrocarbon is used to cool the exhaust nozzle, and both are used as fuel. In the engine first mode of operation, the hydrocarbon is the primary fuel, with just enough hydrogen used to cool the thrust chamber and drive the turbines. In the engine second mode of operation, the hydrogen is the primary fuel, with just enough hydrocarbon used to cool the exhaust nozzle. The hydrocarbon and hydrogen are mixed before entering the combustion chamber.

The present invention provides an improved method of combining the two fuels in a dual-fuel engine, as compared with the prior art. Greater exhaust nozzle cooling capacity, lower fuel temperatures, and maximum efficient use of each fuel are advantages the present invention provides over prior art.

OBJECTS OF THE INVENTION

It is an object of this invention to provide a dual-fuel, dual-mode rocket engine that would enhance the performance of earth-to-orbit vehicles with minimal development time and cost.

Other objects and advantages of this invention will become apparent hereinafter in the specification and drawings which follow.

SUMMARY OF THE INVENTION

A modification is made to a liquid rocket engine that utilizes a gas generator for propellant pump power generation, hydrogen for thrust chamber cooling and gas generator fuel, and a single fuel for thrust chamber fuel and exhaust nozzle cooling. The modification includes a means for delivering and mixing a second fuel with the liquid rocket engine single fuel directly upstream of exhaust nozzle cooling. In the modified engine, one fuel is a high density-impulse fuel and the other is a high specific-impulse fuel. The resulting mixture is then utilized for thrust chamber fuel and exhaust nozzle cooling. The relative quantities of high density-impulse fuel and high specific-impulse fuel within the mixture vary to provide a progressively less dense mixture throughout a rocket flight.

DETAILED DESCRIPTION OF THE INVENTION

The invention is best described in terms of modifications to existing rocket engine concepts. Two embodiments of the invention will hereinafter be described as modifications to two engines: a baseline single-mode booster engine, and a baseline single-mode main engine.

Figure 1:
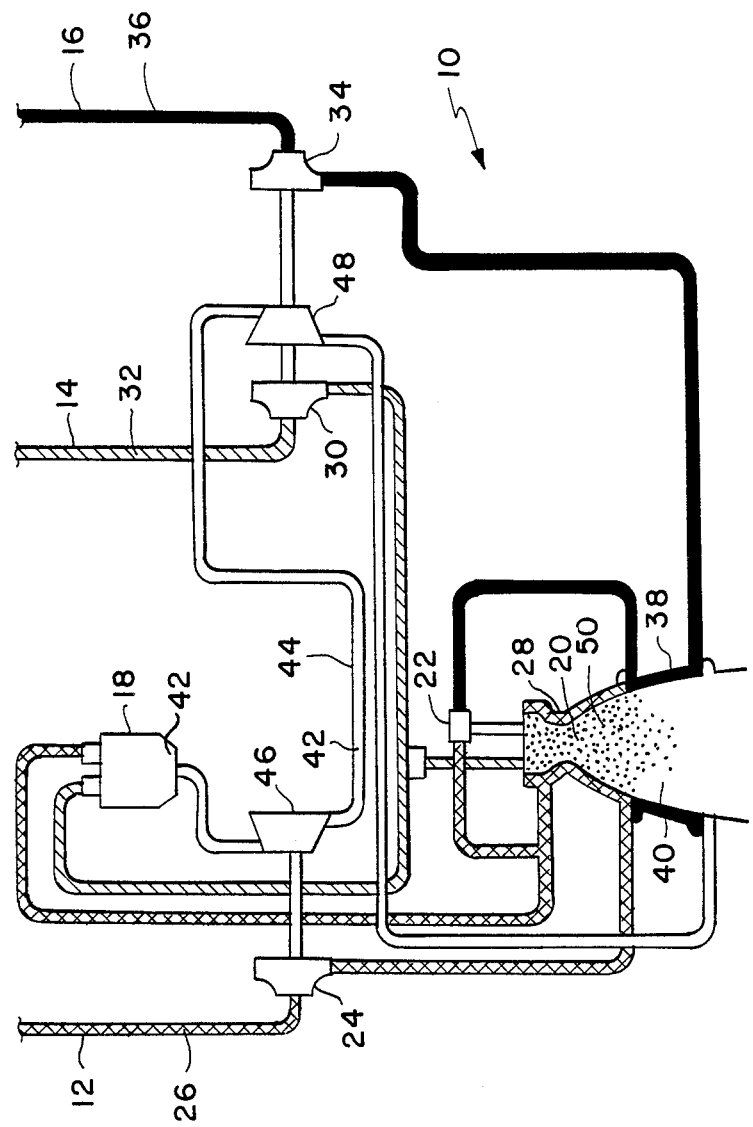
FIG. 1 is a schematic of a baseline single-mode booster engine.

Referring now to FIG. 1, a baseline single-mode booster engine 10 is shown schematically. It consists of three propellant systems: a hydrogen propellant system 12, an oxygen propellant system 14, and a methane propellant system 16. The hydrogen propellant system 12 interfaces with the oxygen propellant system 14 at a gas generator 18, and at a thrust chamber 20. The methane propellant system 16 interfaces with the hydrogen propellant system 12 at a pre-thrust-chamber mixer 22, and with the oxygen propellant system 14 at the thrust chamber 20.

The hydrogen propellant system 12 includes a hydrogen pump 24 which pumps hydrogen fuel 26 from a hydrogen supply (not shown), through a thrust chamber cooling jacket 28 for cooling, and then to both the pre-thrust-chamber mixer 22 and the gas generator 18. The oxygen propellant system 14 includes an oxygen pump 30 which pumps oxygen oxidizer 32 from an oxygen supply (not shown) to both the thrust chamber 20 and the gas generator 18. The methane system 16 includes a methane pump 34 which pumps methane fuel 36 from a methane supply (not shown), through an exhaust nozzle cooling jacket 38 of an exhaust nozzle 40 for cooling, and then to the pre-thrust-chamber mixer 22.

The propellants combustibly interact in two engine locations. The oxygen 32 and hydrogen fuel 26 combustibly interact in the gas generator 18, producing high pressure hot gas 42. The power generation system 44 downstream of the gas generator 18 includes two turbines 46 and 48 that utilize the hot gas 42 to drive the hydrogen pump 24, and the oxygen pump 30 and methane pump 34, respectively. The hot gas 42 is then ejected downstream of the exhaust nozzle 40.

The thrust chamber 20 is the second location in which propellants combustibly interact. Oxygen 32 is injected into the thrust chamber 20 directly from the oxygen propellant system 14. The hydrogen fuel 26 and methane fuel 36 first mix in the pre-thrust chamber mixer 22 before being injected into the thrust chamber 20. The oxygen 32, hydrogen fuel 26, and methane fuel 36 combustibly interact in the thrust chamber 20, with the resulting thrust-generating exhaust gas 50 then exiting through the exhaust nozzle 40. The main fuel for this engine is the methane fuel 36, with just enough hydrogen fuel 26 being used to cool the thrust chamber 20 and power the turbines 46 and 48.

Figure 2:
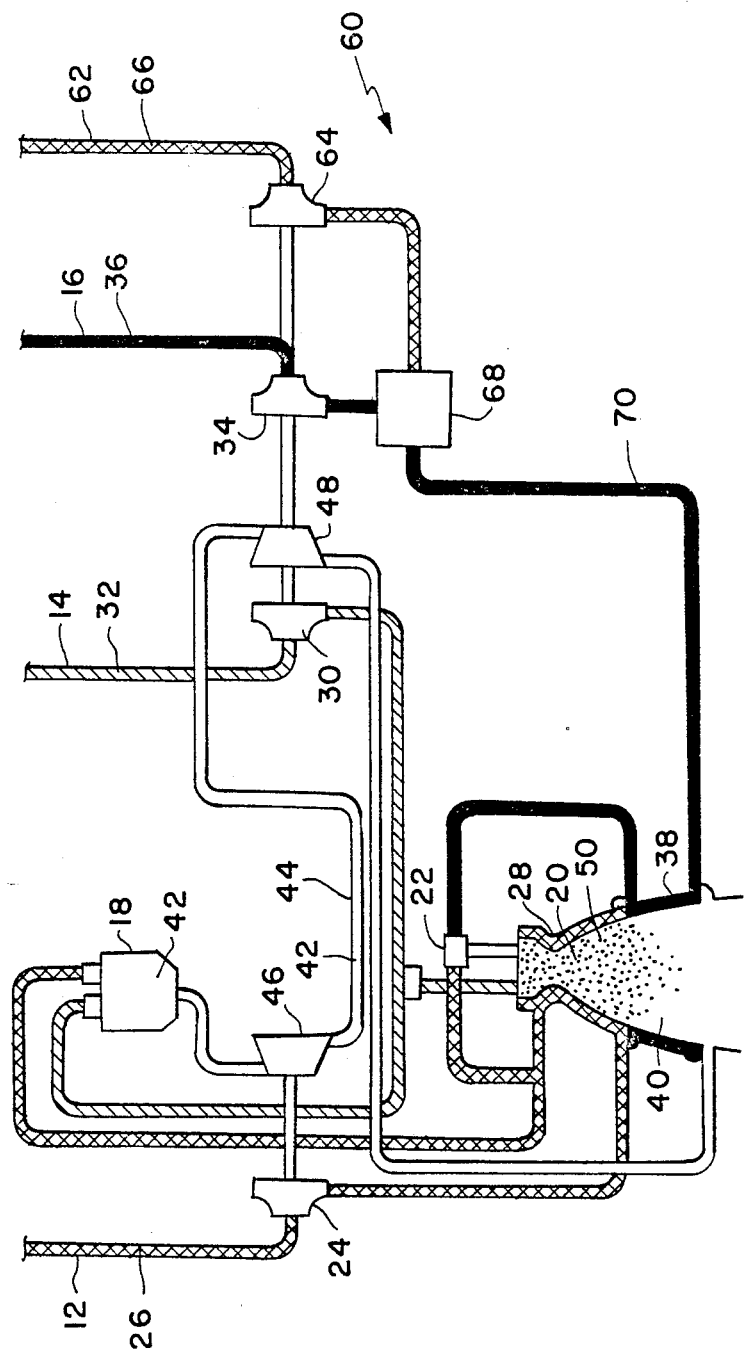
FIG. 2 is a schematic of the baseline single-mode booster engine shown in FIG. 1 modified in accordance with the invention.

Referring now to FIG. 2, a modification is shown to the baseline single-mode booster engine 10 to form one embodiment of the invention 60. A second hydrogen propellant system 62 is added that includes a second hydrogen pump 64 that is operatively connected to the turbine 48. The second hydrogen pump 64 pumps hydrogen fuel 66 from a hydrogen supply (not shown) to a fuel mixer 68, which is added to the methane propellant system 16 directly downstream of the methane pump 34. The methane fuel 36 and the hydrogen fuel 66 are mixed in the fuel mixer 68 to produce a fuel mixture 70. The fuel mixture 70 then goes through the exhaust nozzle cooling jacket 38 for cooling, and then to the pre-thrust-chamber mixer 22 in the same way as is done with methane fuel 36 alone in the baseline single-mode booster engine 10.

The first embodiment of invention 60 operates as a dual-fuel, dual-mode rocket engine as follows. The flow of the methane fuel 36 and the hydrogen fuel 66 is modulated during operation via the methane pump 34 and the second hydrogen pump 64. At the beginning of a flight to orbit, the great majority of the fuel entering the fuel mixer 68 is the methane fuel 36. The ratio of the methane fuel 36 and the hydrogen fuel 66 entering the fuel mixer 68 is varied throughout the flight depending on the relative importance of density-impulse and specific-impulse at any given point in the flight. Near the end of the flight, the great majority of the fuel entering the fuel mixer 68 is the hydrogen fuel 66. Other than as described above, the first embodiment of the invention 60 operates in the same way as the baseline single-mode booster engine 10.

Figure 3:
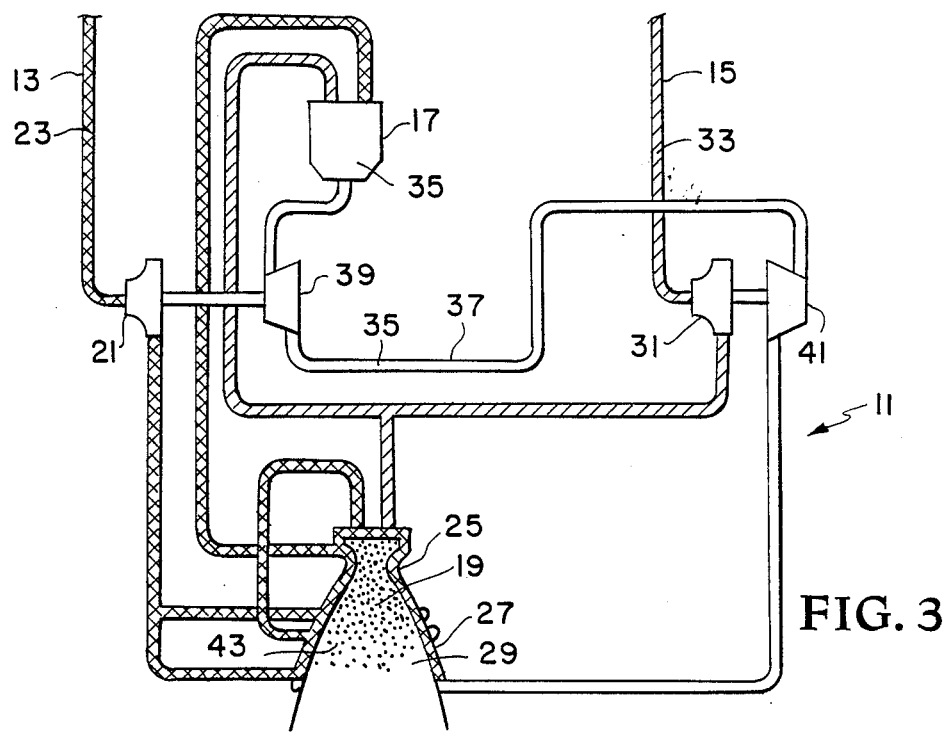
FIG. 3 is a schematic of a baseline single-mode main engine.

Referring now to FIG. 3, a baseline single-mode main engine 11 is shown schematically. It consists of two propellant systems: a hydrogen propellant system 13, and an oxygen propellant system 15. The two propellant systems interface at a gas generator 17, and at a thrust chamber 19.

The hydrogen propellant system 13 includes a hydrogen pump 21 which pumps hydrogen fuel 23 from a hydrogen supply (not shown) to both a thrust chamber cooling jacket 25 for cooling, and an exhaust nozzle cooling jacket 27 of an exhaust nozzle 29 for cooling. The hydrogen fuel 23 that flows through the thrust chamber cooling jacket 25 then flows into the gas generator 17. The hydrogen fuel 23 that flows through the exhaust nozzle cooling jacket 27 then flows into the thrust chamber 19.

The oxygen propellant system 15 includes an oxygen pump 31 which pumps oxygen oxidizer 33 from an oxygen supply (not shown) to both the thrust chamber 19 and the gas generator 17.

The two propellants combustibly interact in two engine locations. The first location is the gas generator, where a high pressure hot gas 35 is produced. The power generation system 37 downstream of the gas generator 17 includes two turbines 39 and 41 that utilize the hot gas 35 to drive the hydrogen pump 21 and the oxygen pump 31, respectively. The hot gas 35 is then ejected downstream of the exhaust nozzle 29.

The thrust chamber 19 is the second location in which propellants combustibly interact. Oxygen 33 is injected into the thrust chamber 19 directly from the oxygen propellant system 15, and hydrogen fuel 23 is injected into the thrust chamber 19 directly from the hydrogen propellant system 13. The oxygen 33 and hydrogen fuel 23 combustibly interact in the thrust chamber 19, with the resulting thrust-generating exhaust gas 43 then exiting through the exhaust nozzle 29.

Figure 4:
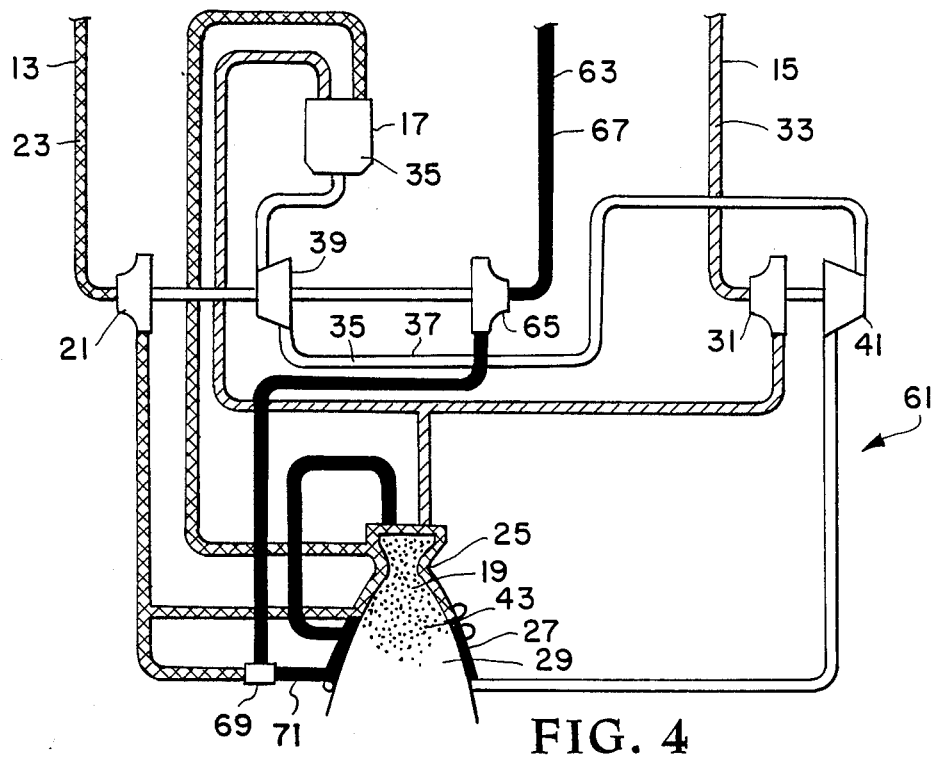
FIG. 4 is a schematic of the baseline single-mode main engine shown in FIG. 3 modified in accordance with the invention.

Referring now to FIG. 4, a modification is shown to the baseline single-mode main engine 11 to form a second embodiment of the invention 61. A methane propellant system 63 is added that includes a methane pump 65 that is operatively connected to the turbine 39. The methane pump 65 pumps methane fuel 67 from a methane supply (not shown) to a fuel mixer 69, which is added to the hydrogen propellant system 13 directly upstream of the exhaust nozzle cooling jacket 27. Both the methane fuel 67 and the hydrogen fuel 23 are mixed in the fuel mixer 69 to produce a fuel mixture 71. The fuel mixture 71 then passes through the exhaust nozzle cooling jacket 27 for cooling, and then directly to the thrust chamber 19 in the same way as is done with hydrogen fuel 23 alone in the baseline single-mode main engine 11.

The second embodiment of the invention 61 operates as a duel-fuel, dual-mode rocket engine in much the same way as the first embodiment of the invention 60. The flow of methane fuel 67 and hydrogen fuel 23 is modulated during operation via the methane pump 65 and the hydrogen pump 21. The ratio of the methane fuel 67 and the hydrogen fuel 23 entering the fuel mixer 69 is varied throughout the flight according to the same flight requirements of the first embodiment of the invention 60. Other than as described above, the second embodiment of the invention 61 operates in the same way as the baseline single-mode main engine 11.

The three main advantages of the invention over prior dual-fuel engines come from the novel mixing of fuels before exhaust nozzle cooling. First, this allows all of the engine fuel to cool the exhaust nozzle. This provides great cooling capacity, and avoids having any amount of fuel get very hot before combustion. Second, the ratio of fuels used throughout a flight can be wholly dependent on performance requirements, and not on exhaust nozzle cooling requirements. A third advantage is that the invention adds a minimum number of state-of-the-art components to baseline single-mode rocket engines, and is therefore relatively easy to develop for near term applications.

Anyone skilled in the art of rocket propulsion should realize that many alternate embodiments of the invention are possible. The use of other high density-impulse fuels other than methane, and other high specific-impulse fuels other than hydrogen are within the scope of the present invention. The pump and turbine arrangements can vary considerably and still be within the scope of the invention, as exemplified by the two embodiments described.

Although two embodiments of the invention have been described in detail, it should be recognized that numerous other modifications, substitutions, and changes may be made to the invention without departing from the spirit hereof.

What is claimed as new and desired to be secured by Letters Patent of the United States is:

I claim:

1. In a liquid rocket engine that utilizes a gas generator for propellant pump power generation, hydrogen for thrust chamber cooling and gas generator fuel, and a single fuel for thrust chamber fuel and for passing through an exhaust nozzle cooling jacket, the improvement therein comprising:
    a means for delivering a second fuel to, and mixing said second fuel with said single fuel directly upstream of said exhaust nozzle cooling jacket;
    wherein one fuel is a high density-impulse fuel and the other fuel is a high specific-impulse fuel;
    the mixture of said high density-impulse fuel and said high specific-impulse fuel utilized for thrust chamber fuel and for passing through said exhaust nozzle cooling jacket;
    whereby the relative quantities of said high density-impulse fuel and said high specific-impulse fuel within said mixture vary to provide a progressively less dense mixture throughout a rocket flight.

2. The liquid rocket engine of claim 1 wherein said single fuel is a hydrocarbon, and said second fuel is hydrogen.

3. The liquid rocket engine of claim 1 wherein said single fuel is hydrogen, and said second fuel is a hydrocarbon.

4. In a single-mode booster engine, said engine having a fluid cooled thrust chamber and nozzle for receiving combustibly interactive propellants and providing a thrust-generating gaseous output flow, said engine having a first propellant delivery means for supplying a hydrocarbon fuel first to a nozzle cooling jacket of said nozzle for cooling and second to a mixer means, said engine having a second propellant delivery means for supplying an oxidizer to both a gas generator means and to said thrust chamber for effecting combustion, said engine having a third propellant delivery means for supplying a hydrogen fuel first to a thrust chamber cooling jacket of said thrust chamber for cooling and second to both said gas generator means for combustion and said mixer means, said gas generator means producing a gaseous output by the combustible interaction of said oxidizer and said hydrogen fuel to drive a first and second turbine means, said first and second propellant delivery means each having pump means driven by said first turbine means, said third propellant delivery means having a pump means driven by said second turbine means, said mixer combining said hydrocarbon fuel and said hydrogen fuel and delivering the combination to said thrust chamber to combustibly interact with said oxidizer to produce a thrust-generating gaseous output through said nozzle, the improvement therein comprising:
    a second mixer means placed within said first propellant delivery means downstream of the pump means of said first propellant delivery means and upstream of said nozzle cooling jacket; and
    a fourth propellant delivery means for supplying hydrogen fuel to said second mixer means;
    said fourth propellant delivery means including a pump means driven by said first turbine means; and
    said second mixer means combining said hydrogen fuel from said fourth propellant delivery means and said hydrocarbon fuel from said first propellant delivery means and delivering the combination to said nozzle cooling jacket;
    whereby the relative quantities of said hydrocarbon fuel and said hydrogen fuel delivered to said second mixer means vary to provide a progressively less dense combination during different portions of a rocket flight to both cool said nozzle and mix with said hydrogen from said third propellant delivery means.

5. In a single-mode main engine, said engine having a fluid cooled thrust chamber and nozzle for receiving combustibly interactive propellants and providing a thrust-generating gaseous output flow, said engine having a first propellant delivery means for supplying a hydrogen fuel to both a first hydrogen loop and a second hydrogen loop, said first hydrogen loop first leading to a nozzle cooling jacket of said nozzle for cooling and then to said thrust chamber, said second hydrogen loop leading to a thrust chamber cooling jacket of said thrust chamber for cooling and then to a gas generator means, said engine having a second propellant delivery means for supplying an oxidizer to both said gas generator means and to said thrust chamber where said oxidizer and said hydrogen fuel interact to produce a thrust-generating gaseous output through said nozzle, said gas generator means producing a gaseous output by the combustible interaction of said oxidizer and said hydrogen fuel to drive a first and second turbine means, said first propellant delivery means, having a pump means driven by said first turbine means, said second propellant delivery means having a pump means driven by said second turbine means, the improvement therein comprising:

a mixer means placed within said first hydrogen loop immediately upstream of said nozzle cooling jacket; and a third propellant delivery means for supplying a hydrocarbon fuel to said mixer means;

said third propellant delivery means including a pump means driven by said first turbine means; and said mixer means combining said hydrogen fuel from said first propellant delivery means and said hydrocarbon fuel from said third propellant delivery means and delivering the combination to said nozzle cooling jacket and to said thrust chamber;

whereby the relative quantities of said hydrocarbon fuel and said hydrogen fuel delivered to said mixer means vary to provide a progressively less dense combination during different portions of a rocket flight to both cool said nozzle and combustibly interact with said oxidizer within said thrust chamber.

6. The method of providing thrust in an engine utilizing a gas generator for propellant pump power generation, hydrogen for thrust chamber cooling and gas generator fuel, and a single fuel for thrust chamber fuel and exhaust nozzle cooling comprising the steps of:

delivering a second fuel to the single fuel directly upstream of the exhaust nozzle cooling; mixing the single fuel and second fuel; utilizing the mixture of the single fuel and the second fuel for thrust chamber fuel and exhaust nozzle cooling; and, varying the mixture of the single fuel and the second fuel to provide a progressively less dense mixture while providing thrust to an engine.

7. The method of claim 6 wherein the single fuel is a high density-impulse fuel and the second fuel is a high specific-impulse fuel.

8. The method of claim 7 wherein the single fuel is a hydrocarbon and the second fuel is hydrogen.

9. The method of claim 7 wherein the single fuel is hydrogen and the second fuel is a hydrocarbon.

* * * * *